Sept. 10, 1929.    W. A. KULL    1,727,778
STEERING GEAR ASSEMBLY
Filed April 15, 1927

Inventor
Walter A. Kull
By Blackmore, Spencer & Hulit
Attorneys

Patented Sept. 10, 1929.

1,727,778

UNITED STATES PATENT OFFICE.

WALTER A. KULL, OF SAGINAW, MICHIGAN, ASSIGNOR TO GENERAL MOTORS CORPORATION, OF DETROIT, MICHIGAN, A CORPORATION OF DELAWARE.

STEERING-GEAR ASSEMBLY.

Application filed April 15, 1927. Serial No. 184,105.

The invention relates to improvements in steering gear construction for use with motor vehicles, and has for its object to provide an improved form of engine control associated with the steering gear.

In a prior construction a brake member in the form of a disk or washer was keyed or feathered on the lower end of a hollow operating shaft extending through the steering column and serving to operate the throttle, the brake serving to frictionally hold the shaft in adjusted position. The usual throttle operating arm was then clamped directly on the hollow shaft.

As this shaft was of thin tubular stock, the clamping action caused distortion of the shaft, which tended to separate the brake member from the shaft, and also tended to cause the shaft to bind on a second shaft nested within it. To overcome these difficulties, the present device was developed for distributing the strain over a larger surface.

Objects and advantages will appear from the accompanying drawing taken in conjunction with the accompanying specification, the novel features being specifically pointed out in the claims appended thereto.

Figure 1:
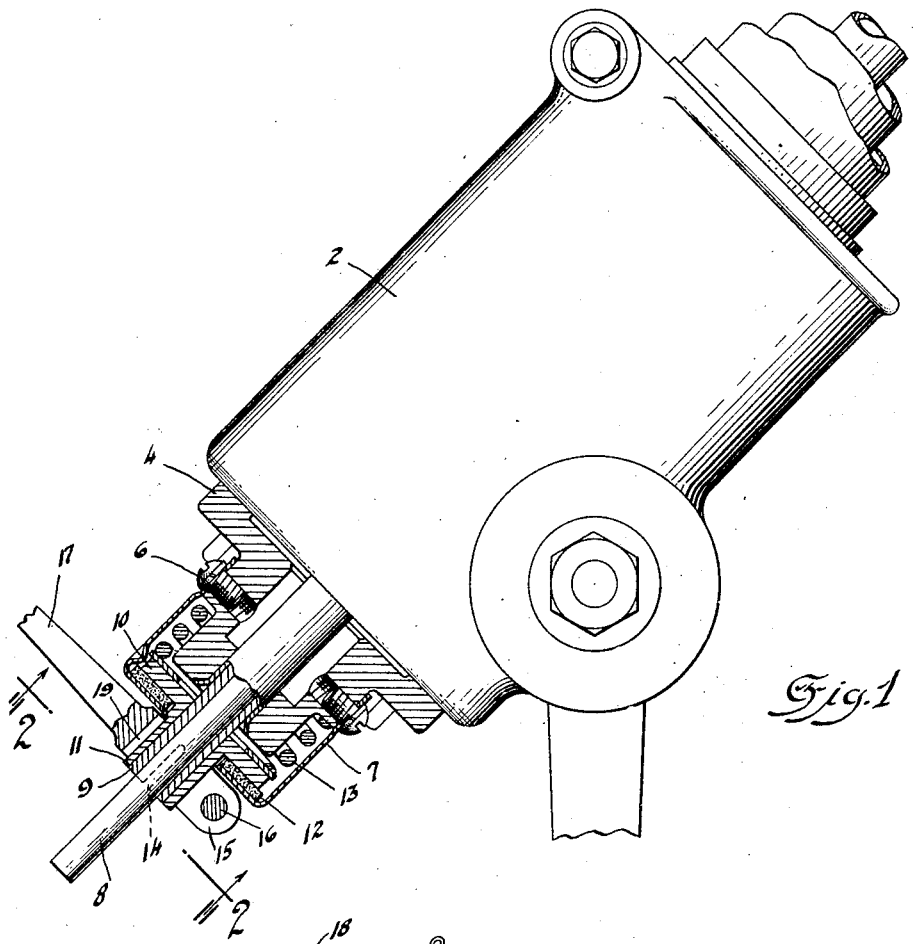
Figure 1 is a side elevation of the lower portion of the steering column, the parts embodying my invention being shown in section.

The numeral 2 indicates a casing member which serves to enclose the mechanism of the steering gear. The lower end of this casing member is closed by a cap 4, attached thereto by bolts 5, and mounted on the cap 4, and fastened thereto by bolts 6 is a housing 7.

Extending from the casing through the cap 4 and housing 7 is one of the nested shafts 8 of the steering gear assembly, and surrounding this nested shaft is the tubular operating shaft 9, shafts 8 and 9 being extended for operating the engine controls.

Figure 2:
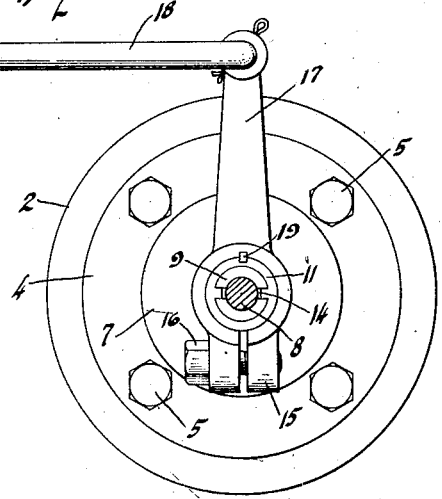
Figure 2 is an elevation taken on the line 2—2 of Figure 1, and shows the lower portion of steering gear housing and the mounting of the operating arm and associated parts on the control shaft.

Non-rotatably mounted on the tubular shaft is a disk-shaped member or washer 10 provided with a tubular extension 11 extending through the housing 7. The washer and tubular extension are feathered onto the shaft 9, as indicated at 14 in Figure 2.

Mounted on the tubular extension and attached thereto by means of a clamp 15 and bolt 16 is an operating arm 17, which operates the rod 18. The numeral 19 indicates a key for holding the arm 17 on the tubular extension.

While in the present case the rod 18 is connected to the throttle (not shown), it is obvious that it may be connected to any other desired mechanism.

The numeral 12 indicates a friction element, such as a leather disk. A coil spring 13 serves to yieldingly hold the washer 10 in contact with the friction disk, and thereby retain the shaft in any adjusted position.

By means of the device described, the strain incident to the turning movement of the operating shaft is distributed over a larger surface, and a lighter, stronger and more durable construction is provided.

While I have shown the washer and tubular extension as cast in one piece, it is obvious that the two parts may be constructed separately and rigidly fastened together.

What I claim is:

1. In a steering gear assembly, the combination of a housing member, a control shaft housed in said member and extending therethrough, a friction element in said housing, a member fixed on said shaft and normally in contact with said friction element, a tubular extension connected to said fixed member and an operating arm fixed on said tubular extension.

2. In a steering gear assembly, the combination of a housing member, a control shaft housed in said member and extending therethrough, a tubular member fixed on said shaft within the housing member and extending outside thereof, means frictionally engaging a portion of said tubular member within the housing for holding said shaft in adjusted position, and a control member fixed on said tubular member outside of said housing member.

3. In a steering gear assembly, the combination of a housing member, a tubular control shaft housed in said member and extending therethrough, a friction element within said housing member, a member fixed on said shaft normally in contact with said friction element and having a tubular portion extending outside of said housing member, and a control member fixed on said tubular portion.

4. In a steering gear assembly, the combination of a housing member, a tubular control shaft housed in said member and extending therethrough, a control member, means for connecting said control member and control shaft comprising a tubular member provided with a portion extending radially within said housing member, and means within said housing member frictionally engaging said radially extending portion for holding said shaft in adjusted position.

5. In a steering gear assembly, the combination of a housing member, a tubular control shaft housed in said member and extending therethrough, a member fixed to said shaft comprising a tubular portion outside of said housing and a radially extending portion within said housing, means frictionally engaging said radially extending portion for holding said shaft in adjusted position, and a control member fixed on said tubular portion outside of said shaft.

6. The combination with a steering column and a tubular control shaft journaled therein, of a member fixed on the lower end of said tubular shaft comprising a tubular portion and a radially extending portion, means frictionally engaging said radially extending portion for holding said shaft in adjusted position, and a control member fixed on said tubular portion.

In testimony whereof I affix my signature.

WALTER A. KULL.